United States Patent Office 2,877,154
Patented Mar. 10, 1959

2,877,154

ANTHELMINTIC COMPOSITIONS CONTAINING CHLORINE SUBSTITUTED AMIDES AND METHODS FOR USING SAME

Redginal I. Hewitt, Nanuet, N. Y., and Lincoln H. Taylor, Jr., Montvale, N. J., assignors to American Cyanamid Company, New York, N. Y., a corporation of Maine No Drawing. Application June 27, 1956
Serial No. 601,094

10 Claims. (Cl. 167—53)

This invention relates to new compositions of matter and methods of compounding and using the same. More particularly, the invention relates to substituted dichloracetamides in compositions containing a non-toxic edible carrier for elimination of internal parasitic helminths.

The disease ankylostomiasis, commonly known as hookworm, is prevalent in warm countries, particularly where plenty of shade and rainfall and a constantly wet soil are present. The four principal species of hookworm are all nematodes of the family *Ancylostomadidae*, such as *Ancylostoma duodenale, Ancylostoma canium, Ancylostoma braziliensis,* and *Necator americanus*. The disease is usually contracted through the skin of the animal and, gaining the capillaries, ascends the bronchial tree and descends the digestive system. The disease is quite prevalent in the southern part of the United States and other countries and is often a public health problem. It thrives particularly where poverty and poorly-balanced diet are prevalent. In the past, it has been treated with compounds such as tetrachlorethylene. This compound, while reasonably effective, causes nausea and drowsiness. Another compound commonly used is hexylresorcinol. While this compound is also somewhat effective, it is irritating to the mucus membranes and is expensive. Where large-scale treatment of the population is involved, the cost is excessive.

In the past, the treatment of man or animal for parasitic helminths such as hookworms was begun with a fast, followed by dosing with an anthelmintic such as 2-naphthyl thymol, oil of chenopodium, hexylresorcinol, tetrachlorethylene, etc. The toxic anthelmintics along with the hookworms must then be removed from the animal's system through the use of purgatives; whereas the compounds of the present invention can be given orally without fasting or the use of purgatives and still produce substantially complete removal of hookworm infection.

Another advantage of the compositions of the present invention is the fact that the compounds can be combined with animal feed and given at certain intervals to produce the desired result.

A still further advantage of the compositions of the present invention is the fact that they can be made cheaply from readily available raw material.

We have now found that the highly effective and relatively cheap compositions of the present invention can be made from dichloracetamides having the following structure:

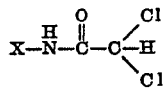

in which X is a member of the group consisting of 2-naphthyl, 3-quinolyl, phenyl, halophenyl, methylphenyl, cyanophenyl, nitrophenyl, acetylphenyl, dimethylphenyl, methylchlorophenyl, and dichlorophenyl radicals and a non-toxic edible carrier.

The compounds forming the active ingredient of the compositions are, in general, crystalline solids, slightly soluble in most organic solvents and relatively insoluble in water.

These active compounds of the present compositions may be prepared by several methods in which the starting material can be a dichloroacetyl halide, dichloroacetyl anhydride, or dichloroacetic acid itself. These intermediates are then reacted with compounds such as a 2-naphthyl, phenyl, or substituted phenyl amine, as shown hereinafter in the examples.

The compounds forming the active ingredients of the compositions of the present invention can be compounds such as N - (2) - naphthyl)dichloracetamide, N - (3 - quinoyl)dichloracetamide, N - (3 - chlorophenyl)dichloracetamide, N - (3 - methyl - 4 - chlorophenyl)dichloracetamide, N - (4 - methyl - 3 - chlorophenyl) dichloracetamide, N - phenyldichloracetamide, N - (3 - cyanophenyl)dichloracetamide, N - (4 - bromophenyl) dichloracetamide, N - (3 - iodophenyl)dichloracetamide, N - (3,4 - dimethylphenyl) dichloracetamide, N - (3 - bromophenyl)dichloracetamide, N - (4 - methylphenyl) dichloracetamide, and the like. The above compounds, in preparing the active compositions, can be made into tablets, capsules, pills, or other pharmaceutical types of medication by combining them with suitable carriers. The compositions can also be combined with animal feed and a definite portion of this feed given at regular intervals for a short or longer period of time. For example, in the treatment of hookworm in dogs, it has been found that active compounds of the present invention may be mixed with prepared dog food in the proportions of approximately one gram per pound and one pound given in divided doses per day for a five-day period is highly effective.

The following is the general procedure for testing the present compounds for hookwork activity. Street dogs of various ages and breeds were inoculated per os with with 3000 infective hookworm larvae cultured in conventional charcoal and sand mixtures. Stoll dilution ova counts (pooled samples of feces from a three-day collection) were made three weeks after inoculation with larvae in order to determine quantitatively the degree of parasitemia. Most treatments were started 21 days after inoculation with larvae. Stoll ova counts were made two weeks after treatment, and the dogs were then killed and necropsied. The entire intestine was examined for hookworms, and the number found was recorded, as indicated in the appended tables. A reduction in the ova counts from 80 to 100 percent in treated dogs was indicative of good activity. An additional criterion of activity was a relatively low number of hookworms in the intestine as compared with non-treated controls having comparable ova counts before the treatment period.

The following Table I illustrates the testing results of the compounds of the present invention in hookworm infections in dogs. Table II shows the results of administering to dogs N-(beta-naphthyl)dichloracetamide in varying dosages. Table III summarizes results obtained when N-(beta-naphthyl)dichloracetamide is administered by combining in dog food.

TABLE I

Comparison of the effects of substituted dichloracetamides and dichloracetanilides against hookworm infections in dogs when administered at 50 mg. per kg. orally twice daily for five days

| Dog No. | Name of Compound | No. of ova per gram of feces | | No. of Hookworms found at Necropsy |
|---|---|---|---|---|
| | | Before Treatment | After Treatment | |
| X332 | Untreated | 21,700 | 25,100 | 277 |
| X319 | | 20,400 | 25,500 | 312 |
| X269 | | 12,600 | 37,300 | 448 |
| X336 | N-(β-Naphthyl)-dichloracetamide | 4,200 | 0 | 0 |
| X304 | | 2,500 | 0 | 0 |
| X302 | | 1,600 | 0 | 0 |
| X317 | N-(m-Chloro)-dichloracetanilide | 5,400 | 0 | 2 |
| X308 | | 2,900 | 0 | 1 |
| X300 | | 1,700 | 0 | 2 |
| X384 | 3-Methyl-4α,α-trichloracetanilide | 37,400 | 2,100 | 99 |
| X358 | | 12,200 | 0 | 0 |
| X372 | | 5,300 | 0 | 3 |
| X410 | 4-Methyl-3,α,α-trichloracetanilide | 49,300 | 0 | 8 |
| X389 | | 3,600 | 300 | 5 |
| X390 | | 3,600 | 0 | 1 |
| X345 | α,α-Dichloroacetanilide | 20,100 | 0 | 13 |
| X414 | | 4,700 | 700 | 22 |
| X345 | | 2,800 | 0 | 5 |
| X412 | M-Cyano-α,α-dichloracetanilide | 30,700 | 200 | 8 |
| X368 | | 4,000 | 0 | 1 |
| X398 | | 3,000 | 0 | 1 |
| X418 | 4-Bromo-α,α-dichoracetanilide | 12,400 | 200 | 1 |
| X382 | | 11,900 | 0 | 9 |
| X403 | | 1,100 | 0 | 0 |
| X461 | 3-Iodo-α,α-dichloracetanilide | 7,600 | 0 | 0 |
| X463 | | 4,000 | 0 | 0 |
| X435 | 4-Methyl-α,α-dichloracetanilide | 1,800 | 0 | 0 |
| X891 | N-(3-quinolyl)-dichloracetamide sulfate | 4,100 | 400 | 15 |
| X923 | | 3,800 | 200 | 4 |
| X935 | | 2,200 | 0 | 0 |
| C299 | N-(m-Bromo) dichloracetanilide | +++ᵃ | +ᵃ | |
| X167 | N-(m-nitro)-dichloracetanilide | +++ᵃ | +--ᵃ | 1 |
| X166 | | +++ᵃ | +--ᵃ | 0 |
| X344 | N-(m-Acetyl)-dichloracetanilide | 49,000 | 4,400 | 115 |
| X420 | | 3,950 | 1,400 | 54 |
| X394 | | 3,400 | 1,400 | 6 |
| X446 | N-(3,4-Dimethyl)-dichloracetanilide | +++ᵃ | +ᵃ | |
| X353 | 2,4,α,α-Tetrachloracetanilide | 11,800 | 600 | 19 |
| X347 | | 8,800 | 600 | 40 |
| X343 | | 2,000 | 400 | 9 |

ᵃ Number of hookworms approximated by salt flotation.
+++ =Many hookworm ova, +=few hookworm ova, +− =scarcely any hookworm ova.

TABLE II

Effects of N-(β-naphthyl)-dichloracetamide against experimental hookworm infections in dogs when administered orally in total doses of from 200 to 500 mg. per kg.

| Dog No. | Dose, mg./kg. | No. Doses Per Day | No. Days Treated | Total Dosage mg./kg. | No. of Ova per g. of Feces | | No. Hookworms Found at Necropsy |
|---|---|---|---|---|---|---|---|
| | | | | | Before Treatment | After Treatment | |
| X10 | 50 | 2 | 2 | 200 | 16,600 | 500 | 19 |
| X6 | 50 | 2 | 2 | 200 | 13,500 | 100 | 4 |
| X5 | 50 | 2 | 2 | 200 | 5,500 | 500 | 43 |
| X9 | 50 | 2 | 2 | 200 | 500 | 0 | 4 |
| X2 | 50 | 2 | 3 | 300 | 37,700 | 0 | 6 |
| X4 | 50 | 2 | 3 | 300 | 11,000 | 400 | 23 |
| X12 | 50 | 2 | 3 | 300 | 4,800 | 1,400 | 17 |
| X1 | 50 | 2 | 3 | 300 | 3,400 | 200 | 9 |
| C323 | 50 | 2 | 4 | 400 | 48,200 | 0 | 2 |
| C327 | 50 | 2 | 4 | 400 | 18,200 | 200 | 6 |
| C324 | 50 | 2 | 4 | 400 | 5,100 | 0 | 3 |
| C319 | 50 | 2 | 4 | 400 | 5,000 | 0 | 5 |
| 432 | 50 | 2 | 5 | 500 | 28,800 | 0 | 0 |
| 457 | 50 | 2 | 5 | 500 | 22,000 | 0 | 2 |
| 450 | 50 | 2 | 5 | 500 | 16,100 | 0 | 1 |
| 440 | 50 | 2 | 5 | 500 | 5,700 | 0 | 0 |

TABLE III

Effect of N-(β-naphthyl)-dichloracetamide against experimental hookworm infections in dogs when administered in the feed for 5 days at daily doses of from 75 to 200 mg. per kg.

| Dog No. | Daily[1] Dose, mg./kg. | No. of ova per gram of feces | | No. of Hookworms Found at Necropsy |
|---|---|---|---|---|
| | | Before Treatment | After Treatment | |
| X445 | 125 | 6,800 | 0 | 7 |
| X442 | 75 | 5,800 | 0 | 0 |
| X440 | 200 | 2,000 | 0 | 4 |
| X443 | 160 | 1,700 | 0 | 0 |
| X431 | 125 | 1,600 | 0 | 0 |
| X444 | 125 | 1,500 | 0 | 0 |

[1] In divided doses, twice daily, in the feed.

The compounds of the present invention are effective in from 0.01 g. to 10 g. in the compositions described herein. When used as an ingredient of animal food, it is desirable that it be fed at the rate of 1 to 200 mg. per kg. of body weight per day.

The following examples show the preparation of the active compounds used in the compositions of the present invention.

EXAMPLE 1.—N-(β-NAPHTHYL)-DICHLORACETAMIDE

A mixture of 20 g. of β-naphthylamine, 200 ml. of chloroform, 22.2 g. of sodium carbonate, and 220 ml. of water is stirred at room temperature, dissolving some of the solid. The mixture is cooled in an ice bath to 5° C., and to it is added dropwise a solution of 22.2 g. of dichloracetylchloride in 50 ml. of chloroform over a period of 20 minutes at such a rate that the temperature is maintained at 6–8° C. During the addition a solid precipitates. The reaction mixture is stirred for an additional 30 minutes. To the reaction mixture there is added 200 ml. of heptane and the product is collected on the filter; being washed several times with water. Yield of white crystals, 29.2 g. (82%); melting point 162°–163° C.

EXAMPLE 2.—N-(m-CHLORO)-DICHLORACETANILIDE

To a solution of 16.1 g. of m-chloraniline in 138 ml. of chloroform is added a solution of 20 g. of anhydrous sodium carbonate in 200 ml. of water. To this is added dropwise over a period of 15 minutes a solution of 20 g.

of dichloracetyl chloride in 50 ml. of chloroform. The solution is stirred an additional 30 minutes, then 200 ml. of heptane is added. The product is filtered off as white crystals, melting point 107°–108° C., weighing 18.8 g. (62%).

EXAMPLE 3.—3-METHYL-α,α,4-TRICHLORACETANILIDE

Prepared as in Example 2 from dichloracetyl chloride and 4-chloro-3-methylaniline in 81% yield; melting point 146°–148° C. after recrystallization from aqueous alcohol.

EXAMPLE 4.—4-METHYL-3,α,α-TRICHLORACETANILIDE

From 17.8 g. of 3-chloro-4-methylaniline, 200 ml. of chloroform, 20 g. of sodium carbonate, and 200 ml. of water, according to the procedure outlined above, there is obtained 26 g. (82%) of product; melting point 134°–135° C., as white crystals. Recrystallization from ethanol affords white crystals; melting point 135°–136° C.

EXAMPLE 5.—α,α-DICHLORACETANILIDE

To a solution of 20 g. of sodium bicarbonate in 200 ml. of water is added 11.5 ml. (11.7 g., 0.126 mole) of aniline. The mixture is stirred and cooled in an ice bath while there is being added dropwise a solution of 13.2 ml. (0.136 mole) of dichloracetyl chloride in 25 ml. of chloroform over a period of 20 minutes. The mixture is stirred at room temperature for an additional hour, and the layers are then separated. The aqueous layer is washed with 30 ml. of chloroform, and the combined chloroform layers are washed with 50 ml. of water. The chloroform solution is dried over magnesium sulfate, filtered, and freed from almost all the solvent at reduced pressure. Heptane (200 ml.) is added to the syrup to induce crystallization. The solid is collected, washed with pentane, and allowed to dry in air. There is obtained 22.9 g. (89%); melting point 112°–115° C. with sintering and sublimation above 98° C. (Lit. melting point 117° C.). The compound is soluble in ethyl acetate and chloroform. It is not soluble in water or hexane.

EXAMPLE 6.—m-CYANO-α,α-DICHLORACETANILIDE

This is prepared as in Example 5, and from 14.9 g. (0.126 mole) of m-aminobenzonitrile there is obtained 24.1 g. (83%) of m-cyano-α,α-dichloracetanilide with melting point of 135°–136° C. Several recrystallizations from benzene-heptane (5:2) give material of analytical purity with a melting point of 139–141° C. The compound is soluble in chloroform, ethyl acetate, and benzene, but is insoluble in water or pentane.

EXAMPLE 7.—4-BROMO-α,α-DICHLORACETANILIDE

From 21.6 g. of p-bromoaniline, 200 ml. of chloroform, 20 g. of sodium carbonate, and 200 ml. of water to which is added a solution of 13.2 ml. of dichloracetyl chloride and 25 ml. of chloroform, according to the procedure outlined above, there is obtained 31 g. (87%) of while crystalline product, melting point 145°–147° C. Recrystallization from ethanol affords white crystals; melting point 146°–147° C.

EXAMPLE 8.—3-IODODICHLORACETANILIDE

In 140 ml. of water there is dissolved 14.0 g. of sodium carbonate, and to this is added 20.0 g. of n-iodoaniline in 140 ml. of chloroform. The mixture is cooled to 5° C., and with stirring there is added dropwise 9.2 ml. of dichloracetylchloride in 25 ml. of chloroform over a period of 20 minutes. The stirring is continued for ½ hour longer, and the white solid which separates is collected by filtration; 7.3 g., melting point 110°–112° C. The chloroform filtrate is dried over magnesium sulfate and evaporated to dryness at reduced pressure, leaving an oil which crystallizes in the addition of 100 ml. of petroleum-ether (90–100° C.), 8.1 g., melting point 107°–109° C. The product is the same as obtained in fraction obtained previously. A sample on recrystallization for analysis from petroleum-ether (90°–100° C.) gave a melting point of 110°–112° C.

EXAMPLE 9.—N-(3,4-DIMETHYL)DICHLORACET-ANILIDE 19.9 g. of 3,4-dimethylaniline is dissolved in 190 ml. of chloroform and added to a solution of 26 g. of sodium carbonate in 260 ml. of water. The mixture is stirred and cooled to 5° C., and 20 g. of dichloracetyl chloride in 50 ml. of chloroform is added dropwise over 20 minutes. After ½ hour of stirring the white needle-like solid which separates is collected by filtration and water washed; yield 25.5 g., melting point 160°–162° C. Recrystallization from ethanol gives the same melting point.

EXAMPLE 10.—N-(m-BROMOPHENYL)DICHLORACET-AMIDE

From 21.8 g. of m-bromoaniline, 140 ml. of chloroform, 20 g. of sodium carbonate, and 200 ml. of water according to the procedure described above, there is obtained 28.1 g. (79%) of white crystalline product; melting point 101–103° C. Recrystallization from heptane gives a melting point of 102°–103° C.

EXAMPLE 11.—4-METHYL-α,α-DICHLORACETANILIDE

From 13.5 g. of p-toluidine, 200 ml. of chloroform, 20 g. of sodium carbonate, and 200 ml. of water according to the procedure described above is obtained 24.1 g. (88%) of white crystalline product; melting point 152°–153° C.

EXAMPLE 12.—N-(3-QUINOLYL)DICHLORACETAMIDE SULFATE

To a solution of 20.0 g. of 3-aminoquinoline in 262 cc. of chloroform was added a solution of 22 g. of anhydrous sodium carbonate in 385 cc. of water. The mixture was stirred at 5° C. in an ice bath, and a solution of 22 g. of dichloracetyl chloride in 50 cc. of chloroform was added dropwise over a period of twenty minutes. The mixture was stirred an additional hour. The product was collected and washed with water and heptane. The yield is 28.5 g. (82%) of N-(3-quinolyl)-dichloracetamide as white crystals, melting point 116°–181° C. dec.

EXAMPLE 13.—N-(m-NITRO)DICHLORACETANILIDE

To a solution of 17.4 g. of m-nitroaniline in 138 cc. of chloroform was added a solution of 20 g. of anhydrous sodium carbonate in 200 cc. of water. The solution was cooled to 5° C., and a solution of 20 g. of dichloracetyl chloride in 50 cc. of chloroform was added dropwise with stirring over a period of twenty minutes. The solution was stirred an additional thirty minutes and the product was filtered to yield 19.2 g. of brown crystals, melting point 102° C. A second crop of material weighing 8.0 g., melting point 104° C., was obtained from the chloroform layer of the filtrate by the addition of heptane. The first crop of material was recrystallized from chloroform by the addition of heptane to yield 17.5 g., melting point 104° C. Total yield, 24.5 g. (78%), melting point 104° C.

EXAMPLE 14.—N-(m-ACETYL)DICHLORACETANILIDE

To a solution of 20 g. of sodium carbonate in 200 cc. of water was added 17 g. of 3-aminoacetophenone and 200 cc. of chloroform, and the mixture was brought to +4° C. with stirring and external cooling. A solution of 13.2 cc. of dichloroacetyl chloride in 25 cc. chloroform was added dropwise at a rate which kept the internal temperature between 3° and 7° C. This took 40 minutes. After completion of addition, stirring at room temperature was continued for one hour. The two phases were then separated, and the aqueous phase was washed with 50 cc. of chloroform. The combined chloroform solution was mixed with 200 cc. of heptane, and the solid material which precipitated was filtered off. The filtrate was evaporated to a small volume, and the solid which formed was collected and added to the first portion of solid material. The combined solids were placed in 150 cc. of water which contained a few drops of Aerosol T, and the mixture was stirred for a few minutes and was then filtered. The precipitate was dried on the steam bath to afford 28.7 g., with melting point 139°–140.5° C. Several recrystallizations from benzeneheptane yielded analytically pure 3-acetyl-α,α-dichloroacetanilide, with melting point 141°–152.5° C. The compound is soluble in benzene, chloroform, and ethyl acetate; it is insoluble in water or in hexane.

EXAMPLE 15.—2,4,α,α-TETRACHLORACETANILIDE

To a stirred solution of 20 g. of anhydrous sodium carbonate, 200 cc. of water, 20.4 g. of 2,4-dichloroaniline, and 200 cc. of chloroform, cooled to 5° C. in an ice bath was added drop-wise a solution of 13.2 cc. of dichlorocetyl chloride in 25 cc. of chloroform. The addition took approximately 15 minutes; the temperature being maintained at between 5° and 7° C. At the end of the addition, a solid separated. Stirring was continued for an additional 30 minutes. After the addition of 200 cc. of heptane, the solid was collected on the filter and washed with heptane to give 28.2 g. (82%); melting point 129°–130° C.

We claim:

1. An article of manufacture for veterinary use comprising a quantity of from about 0.01 g. to 10 g. of a compound having the formula:

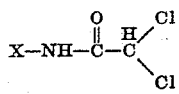

in which X is a member of the group consisting of 2-naphthyl, 3-quinolyl, phenyl, halophenyl, dihalophenyl lower alkylphenyl, lower-alkylhalophenyl, diloweralkylphenyl, nitrophenyl, acetylphenyl, and cyanophenyl radicals and a non-toxic edible substantially digestible carrier.

2. An article of manufacture for veterinary use comprising a quantity of from about 0.01 g. to 10 g. of a compound having the formula:

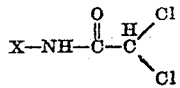

in which X is a member of the group consisting of 2-naphthyl, 3-quinolyl, phenyl, halophenyl, dihalophenyl, lower alkylphenyl, lower-alkylhalophenyl, diloweralkylphenyl, nitrophenyl, acetylphenyl, and cyanophenyl radicals and a pharmaceutical substantially digestible carrier.

3. An article of manufacture for veterinary use comprising a quantity of from about 0.01 g. to 10 g. of a compound having the formula:

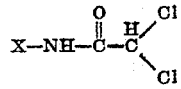

in which X is a member of the group consisting of 2-naphthyl, 3-quinolyl, phenyl, halophenyl, dihalophenyl, lower alkylphenyl, loweralkylhalophenyl, diloweralkylphenyl, nitrophenyl, acetylphenyl, and cyanophenyl radicals in a pharmaceutical capsule.

4. A method of eliminating helminths from the alimentary canal of domestic animals comprising feeding a quantity sufficient to provide a daily dose within the range of from 1 to 200 mg. per kg. of body weight per day of a compound having the formula

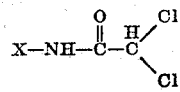

in which X is a member of the group consisting of 2-naphthyl, 3-quinolyl, phenyl, halophenyl, dihalophenyl, lower alkylphenyl, lower-alkylhalophenyl, diloweralkylphenyl, nitrophenyl, acetylphenyl, and cyanophenyl radicals and an animal feed.

5. A method of substantially eliminating hookworm from dogs which comprises feeding a quantity sufficient to provide a daily dose within the range of from 1 to 200 mg. per kg. of body weight per day of a compound having the formula:

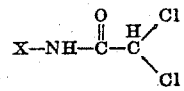

in which X is a member of the group consisting of 2-naphthyl, 3-quinolyl, phenyl, halophenyl, dihalophenyl, lower alkylphenyl, lower-alkylhalophenyl, diloweralkylphenyl, nitrophenyl, acetylphenyl, and cyanophenyl radicals and a dog feed.

6. A composition of matter for veterinary use comprising a quantity of from about 0.01 g. to 10 g. of N-(β-naphthyl)dichloracetamide and a non-toxic edible substantially digestible carrier.

7. A composition of matter for veterinary use comprising a quantity of from about 0.01 g. to 100 g. of N-(m-chloro)dichloracetanilide and a non-toxic edible substantially digestible carrier.

8. A composition of matter for veterinary use comprising a quantity of from about 0.01 g. to 100 g. of 3-methyl-4,α,α-trichloracetanilide and a non-toxic edible substantially digestible carrier.

9. A composition of matter for veterinary use comprising a quantity of from about 0.01 g. to 100 g. of α,α-dichloracetanilide and a non-toxic edible substantially digestible carrier.

10. A composition of matter for veterinary use comprising a quantity of from about 0.01 g. to 100 g. of N-(3-quinolyl)-dichloracetamide and a non-toxic edible substantially digestible carrier.

References Cited in the file of this patent

FOREIGN PATENTS 695,907    Germany _____ Sept. 5, 1940

OTHER REFERENCES

Clark: Chem. Abst., vol. 49, February 1955, pp. 1611-F and 1614-B.